(12) United States Patent
Heidan et al.

(10) Patent No.: US 9,186,966 B2
(45) Date of Patent: Nov. 17, 2015

(54) DRIVE SYSTEM FOR A MOVABLE ROOF PART OF A ROOF MODULE OF A MOTOR VEHICLE

(71) Applicants: Michael Heidan, Stuttgart (DE);
Kristian Franz, Stuttgart (DE);
Sebastian Krause, Fichtenberg (DE);
Dirk Vogt, Stuttgart (DE)

(72) Inventors: Michael Heidan, Stuttgart (DE);
Kristian Franz, Stuttgart (DE);
Sebastian Krause, Fichtenberg (DE);
Dirk Vogt, Stuttgart (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/459,866

(22) Filed: Aug. 14, 2014

(65) Prior Publication Data
US 2015/0048655 A1    Feb. 19, 2015

(30) Foreign Application Priority Data

Aug. 16, 2013  (DE) .......................... 10 2013 216 292

(51) Int. Cl.
*B60J 7/057*    (2006.01)
*B60J 7/043*    (2006.01)
*B60J 7/02*     (2006.01)

(52) U.S. Cl.
CPC ........ *B60J 7/057* (2013.01); *B60J 7/024* (2013.01); *B60J 7/0435* (2013.01)

(58) Field of Classification Search
CPC .......... B60J 7/057; B60J 7/0435; B60J 7/024
USPC ................... 296/216.02–216.05, 220.01, 223
See application file for complete search history.

(56) References Cited

U.S. PATENT DOCUMENTS

| | | | |
|---|---|---|---|
| 6,820,916 | B2 | 11/2004 | Dietl |
| 2003/0155795 | A1 | 8/2003 | Dietl |

FOREIGN PATENT DOCUMENTS

| | | | |
|---|---|---|---|
| DE | 4124528 | * | 7/1992 |
| DE | 102 03 204 A1 | | 8/2003 |
| DE | 20 2007 001 217 U1 | | 5/2007 |
| DE | 10 2006 037 787 A1 | | 4/2008 |
| DE | 10 2007 010 317 A1 | | 9/2008 |
| DE | 10 2009 012 006 A1 | | 9/2010 |

* cited by examiner

*Primary Examiner* — Dennis H Pedder
(74) *Attorney, Agent, or Firm* — Flynn, Thiel, Boutell & Tanis, P.C.

(57) ABSTRACT

A drive system including a support bar to which the roof part is fastened, wherein the support bar during operation of the drive system is displaced between a closed position of the roof part and an open position of the roof part. For the displacement of the support bar between the closed position and the open position, a front guide carriage, a rear tilting mechanism as well as a control carriage mechanically controlling the guide carriage and the tilting mechanism are provided.
The guide carriage and the control carriage are geometrically designed such that the guide carriage and the control carriage are able to be positioned and displaced inside the guide rail overlapping one another in parallel in the transverse direction of the vehicle.

17 Claims, 14 Drawing Sheets

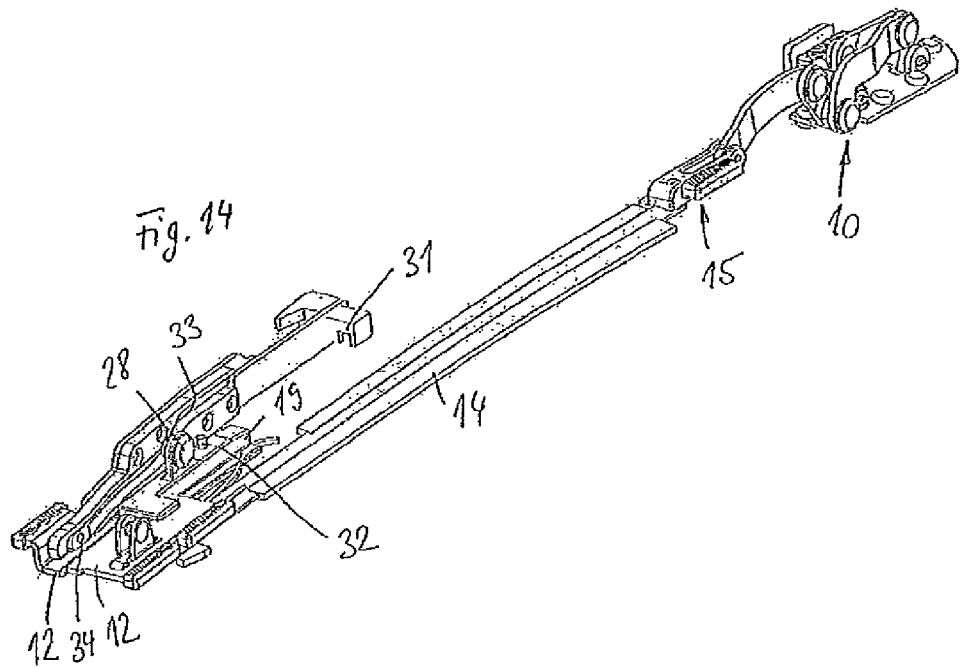
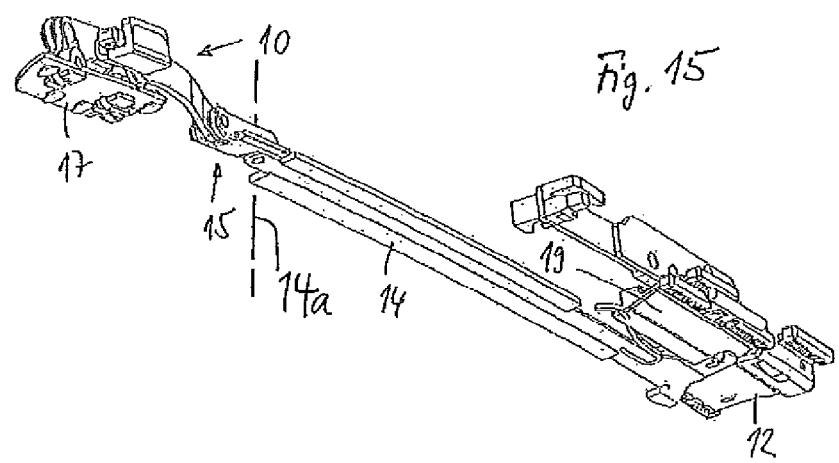

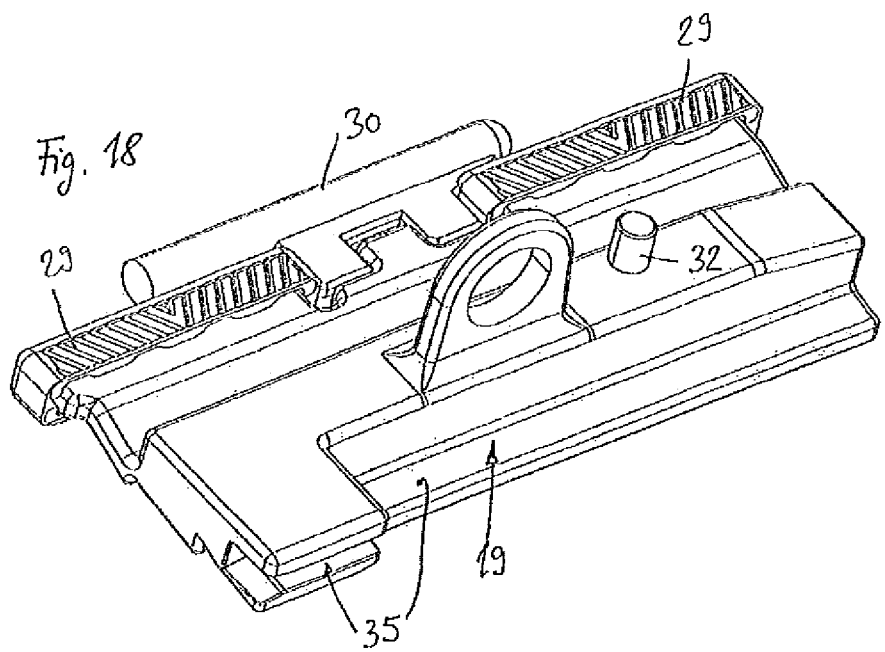
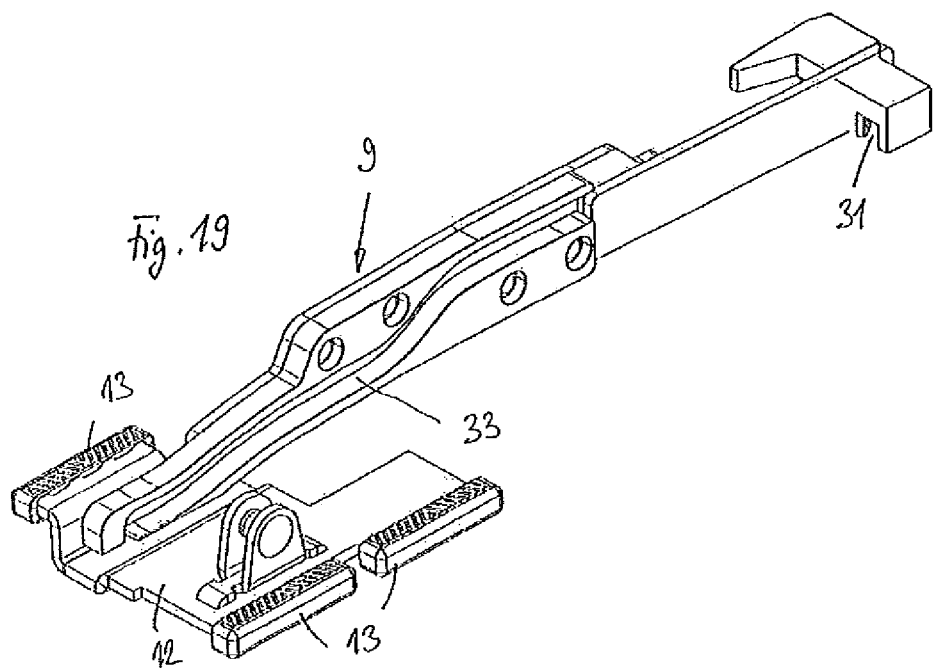

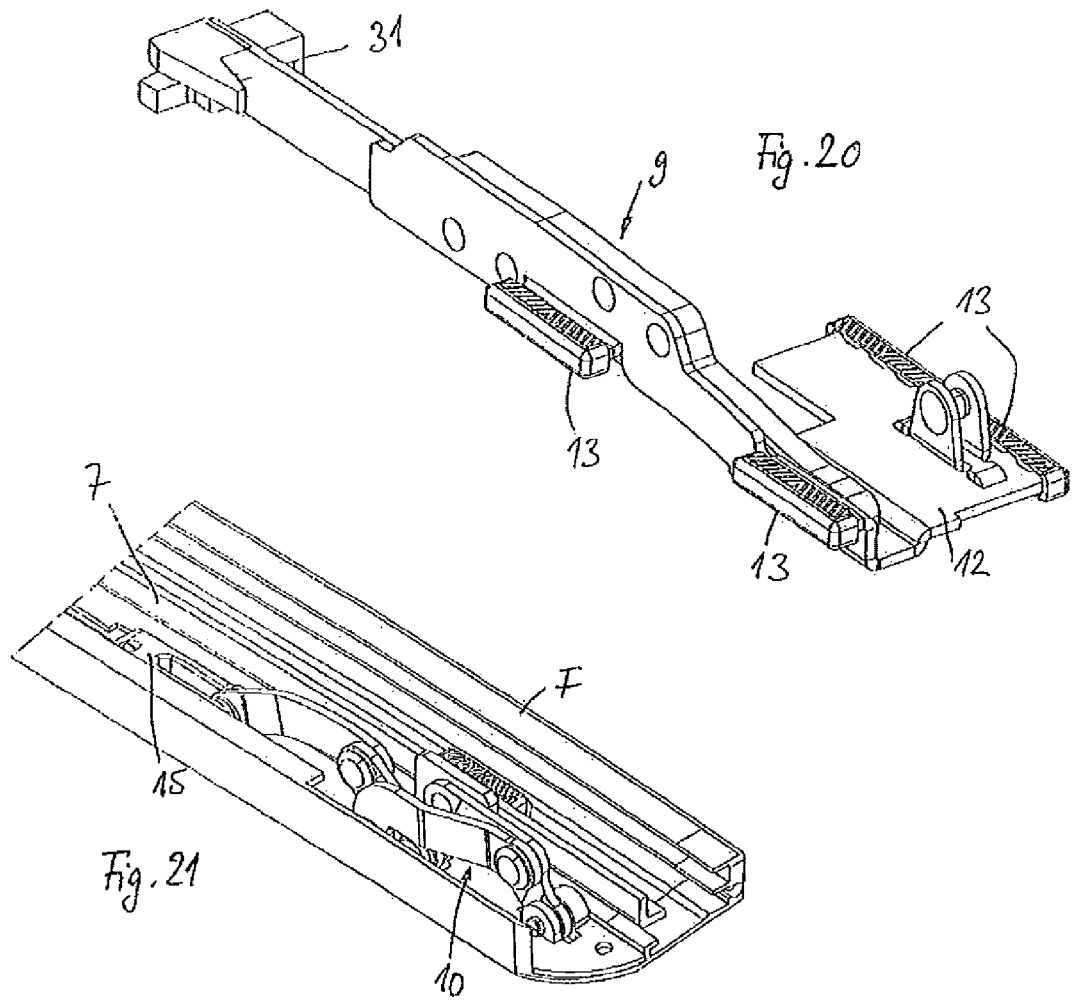
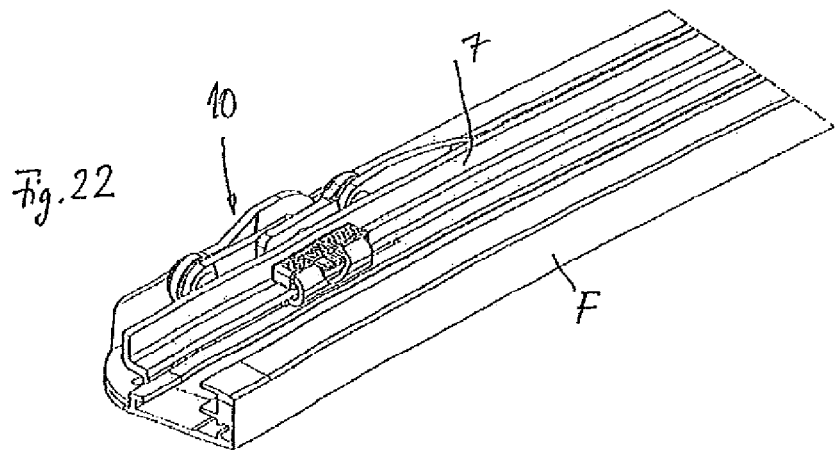

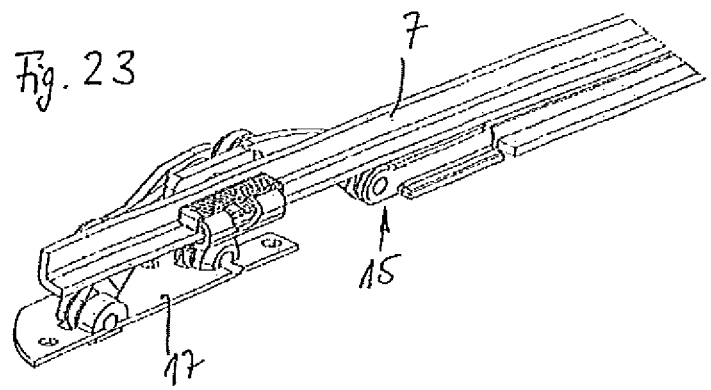
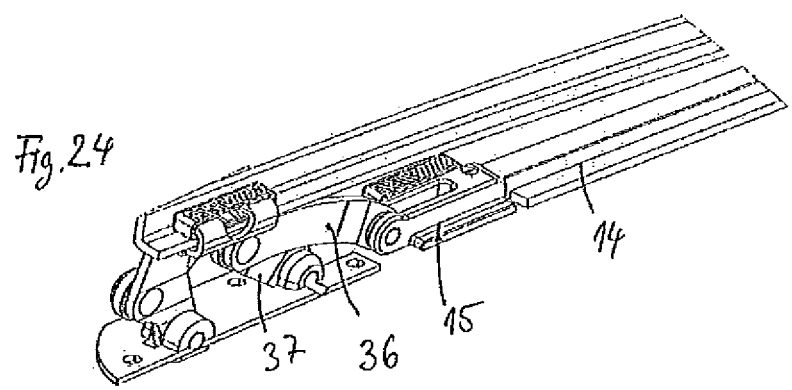
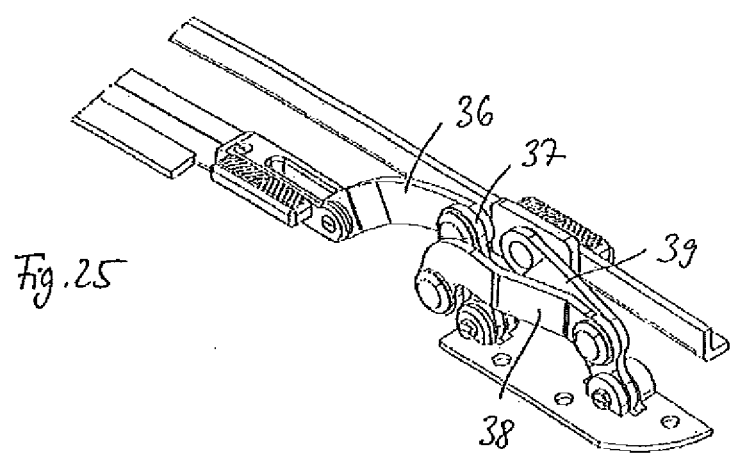

DRIVE SYSTEM FOR A MOVABLE ROOF PART OF A ROOF MODULE OF A MOTOR VEHICLE

CROSS-REFERENCE TO RELATED APPLICATIONS

This claims priority from German Patent Application No. DE 102013216292.8, filed on Aug. 16, 2013, the disclosure of which is hereby incorporated by reference into this application in its entirety.

FIELD OF THE INVENTION

The invention relates to a drive system for a movable roof part of a roof module of a motor vehicle, in particular of a passenger motor vehicle, comprising a support bar to which the roof part may be fastened, wherein the support bar during operation of the drive system is able to be displaced between a closed position of the roof part, a ventilation position and an open position of the roof part displaced to the rear over a stationary roof part of the roof module, wherein for the displacement of the support bar between the closed position and the open position of the roof part—viewed in the longitudinal direction of the vehicle—a front guide carriage, a rear tilting mechanism as well as a control carriage mechanically controlling the guide carriage and the tilting mechanism are provided, and wherein the guide carriage and the control carriage are longitudinally displaceable in a guide rail fixed to the roof module, and comprising a drive member which is movable along the guide rail for displacing the control carriage.

Such a drive system is used for spoiler roofs of passenger motor vehicles in which the movable roof part in its open position is displaced upwards and to the rear beyond the roof contour of the passenger motor vehicle.

BACKGROUND OF THE INVENTION

Such a spoiler roof is disclosed in DE 20 2007 001 217 U1. The known roof module has a roof part which is displaceable above a roof contour of the vehicle roof. To this end, two drive systems designed identically to one another are assigned to the openable roof part on its opposing longitudinal sides, said drive systems being movable in a synchronized manner relative to one another. An electrical drive serves for the adjustment of the drive systems. The drive system comprises a rear tilting mechanism as well as a front pivoting mechanism in order to tilt the roof part and to displace the roof part to the rear.

DE 10 2006 037 787 A1 discloses a drive system for an openable vehicle roof comprising a rear tilting mechanism as well as a front guide carriage and a control carriage which are provided for tilting and longitudinally displacing the movable roof part between a closed position and an open position.

OBJECTS AND SUMMARY OF THE INVENTION

It is the object of the invention to provide a drive system of the type mentioned in the introduction which permits a compact overall height of the roof module.

This object is achieved by the guide carriage and the control carriage being geometrically designed such that the guide carriage and the control carriage are able to be positioned and displaced inside the guide rail overlapping one another in parallel in the transverse direction of the vehicle. By the possibility according to the invention of being able to position the guide carriage and control carriage adjacent to one another in parallel in the transverse direction of the vehicle, a compact overall height of the drive system may be achieved in the vertical direction of the vehicle and in the longitudinal direction of the vehicle. The control carriage according to the invention is able to be displaced adjacent to the guide carriage. Advantageously, in each case a drive system is assigned to the movable roof part on opposing longitudinal sides, said drive systems being designed to be functionally identical to one another and connected together in a synchronized manner via the roof part. It is also possible to assign to the roof part just one single drive system centrally arranged below the roof part. The solution according to the invention is suitable in a particularly advantageous manner for roof modules of passenger motor vehicles. However, it is also possible to provide the drive system for roof modules of other motor vehicles, such as trucks, buses or rail vehicles.

In an embodiment of the invention, sliding elements are assigned in each case to the guide carriage and the control carriage, said sliding elements being guided at least partially in guide tracks of the guide rail offset relative to one another in the vertical direction of the vehicle. As a result, the guide carriage and the control carriage may be positioned and displaced adjacent to one another in parallel in the transverse direction of the vehicle.

In a further embodiment of the invention, a control slide is arranged on the support bar on the front face, said control slide being flanked in parallel by a complementary guiding slide arranged on the guide carriage, and the control carriage has a control lever which is arranged between the control slide and the guiding slide and on opposing sides in the transverse direction of the vehicle is operatively connected to the control slide of the support bar, on the one hand, and the guiding slide of the guide carriage, on the other hand. Advantageously, the control lever comprises two slide pins protruding in the transverse direction of the vehicle on opposing sides, one thereof engaging in the control slide of the support bar and the other engaging in the guiding slide of the guide carriage. The slides adapted to one another, namely the control slide and the guiding slide, serve in combination with the control lever to achieve a lifting of the support bar on the front face and thus of the movable roof part when transferred from the closed position into the ventilation position or the open position.

In a further embodiment of the invention, the guide carriage comprises a front axial stop and a rear axial stop for the control carriage, said axial stops being spaced apart from one another according to a first displacement path of the control carriage and limiting the displacement path of the control carriage relative to the guide carriage and effecting a driving of the guide carriage by the control carriage with a displacement movement along a further displacement path of the control carriage passing beyond the first displacement path. As a result, a limited relative mobility of the control carriage in the longitudinal direction of the vehicle may be achieved, by the displacement path of the control carriage being limited independently of the guide carriage. This first displacement path in which the control carriage moves along the guide rail, without driving the guide carriage, serves to displace the movable roof part between the closed position and the ventilation position.

In a further embodiment of the invention, the rear tilting mechanism is operatively connected to a coupling profile protruding to the front in the longitudinal direction of the guide rail, said coupling profile being provided at its front end region remote from the tilting mechanism with at least one coupling means which is provided for a connection with a limited path to a complementary coupling means of the control carriage. The coupling profile is designed to be dimensionally stable in the longitudinal direction of the guide rail, in order to effect a transmission of movement from the control carriage to the rear tilting mechanism. Advantageously, the coupling profile is designed as a planar strip which bears against a base of the guide rail such that the guide carriage is able to pass over the planar strip, i.e. the coupling profile in the longitudinal direction of the guide rail. The width of the coupling profile is selected such that the control carriage is able to slide past the coupling profile at the side.

In a further embodiment of the invention, the coupling profile is mounted with limited mobility transversely to the guide rail and the guide rail and the coupling profile have latching and/or support profiles which are complementary to one another, in order to secure the coupling profile positively in a latching position on the guide rail. As the coupling profile is operatively connected to the rear tilting mechanism, a securing of the coupling profile to the guide rail inevitably also results in a securing of the rear tilting mechanism in a defined position, preferably in a tilted position of the support bar. The support bar in the region of the rear tilting mechanism is mounted thereon in a slidably movable manner so that the support bar in the tilted position of the rear tilting mechanism is able to slide on said tilting mechanism to the rear in the longitudinal direction of the vehicle in order to transfer the roof part into the open position.

In a further embodiment of the invention, at least one spring means which is effective between the control carriage and the coupling profile is provided, said spring means spring-loading the coupling profile in the direction of the latching and/or support profile of the guide rail. As a result, an automatic latching of the coupling profile is ensured in the corresponding latching and/or support profile of the guide rail. By a corresponding coupling means of the control carriage, the coupling profile is able to be released again from the latching position, as soon as the control carriage moves past the coupling profile again in the opposing direction.

In a further embodiment of the invention, the rear tilting mechanism has a pivoting lever arrangement which supports a tilted position of the support bar in a statically stable manner, and the lever ratios and dimensioning thereof are designed such that in the closed position of the roof part in the region of the rear tilting mechanism an overall height of less than 42 mm—measured from an upper edge of the roof part to a lower edge of the guide rail—is provided. In this case, it is assumed that the roof part is designed as a glass top with a thickness of ca. 4 to 6 mm, and that an adjusting range for the support bar and roof part of ca. 4 mm and a thickness of a base of the guide rail of approximately 2 mm are assumed. The tilting mechanism, therefore, takes up approximately 30 mm in overall height. The pivoting lever arrangement comprises a plurality of lever arms which are coupled together rigidly or in an articulated manner and which are aligned at an angle to one another such that in the closed position a low overall height results and yet for the tilted position a sufficient lifting of the support bar and thus of the movable roof part is ensured in order to be able to displace the movable roof part to the rear over a roof contour of the roof module. The static stability is produced by a corresponding position above dead center of the pivoting lever arrangement in the tilted position.

In a further embodiment of the invention, over the entire length of the guide rail in the closed position of the roof part, the drive system has an overall height of less than 42 mm—measured from an upper edge of the roof part to a lower edge of the guide rail. In this case, the previously described height ratios are assumed. As a result, it is ensured that sufficient headroom is available for vehicle occupants in a vehicle interior of a passenger motor vehicle which is provided with the roof module.

In a further embodiment of the invention, manually actuatable fastening means are provided for adjusting and securing the movable roof part to the support bar, said fastening means having tool engagement surfaces oriented inwardly toward the roof center in the transverse direction of the vehicle, said tool engagement means being accessible from the vehicle interior when the roof part is in its closed position. As a result, it is possible to undertake an adjustment of the roof part relative to the roof contour of the motor vehicle in the closed position of the roof part and from the vehicle interior. Consequently, it is possible to provide a particularly simple and secure means of adjustment. Alternatively, fastening means which are able to be actuated in a semi-automatic manner are provided for adjusting and securing the movable roof part.

The invention also relates to a roof module of a motor vehicle, in particular of a passenger motor vehicle, comprising a movable roof part and comprising at least one drive system according to the previously described features and embodiments.

BRIEF DESCRIPTION OF THE DRAWINGS

Further advantages and features of the invention are revealed in the claims and in the following description of a preferred exemplary embodiment of the invention which is shown with reference to the drawings, in which:

FIG. 14 shows the drive system according to FIG. 13 with the omission of a support bar which is able to be connected to the movable roof part, FIG. 15 shows the drive system according to FIG. 14 in an isometric view obliquely from below, FIG. 18 shows in an enlarged isometric view of a control carriage of the drive system according to FIGS. 3 to 17, FIG. 19 shows in an isometric view a guide carriage of the drive system according to FIGS. 3 to 17, FIG. 20 shows the guide carriage according to FIG. 19 in a different perspective view, FIG. 21 shows a rear tilting mechanism of the drive system according to FIGS. 3 to 15, FIG. 22 shows the rear tilting mechanism according to FIG. 21 in a different perspective view, FIG. 23 shows the rear tilting mechanism according to FIGS. 21 and 22 with the omission of a guide rail of the roof module, FIGS. 24 and 25 show the rear tilting mechanism according to FIG. 23 in further adjusted positions and FIGS. 26 to 28 show the rear tilting mechanism in its tilted position in different perspectives and (FIG. 28) with the omission of the guide rail.

DETAILED DESCRIPTION

Figure 1:
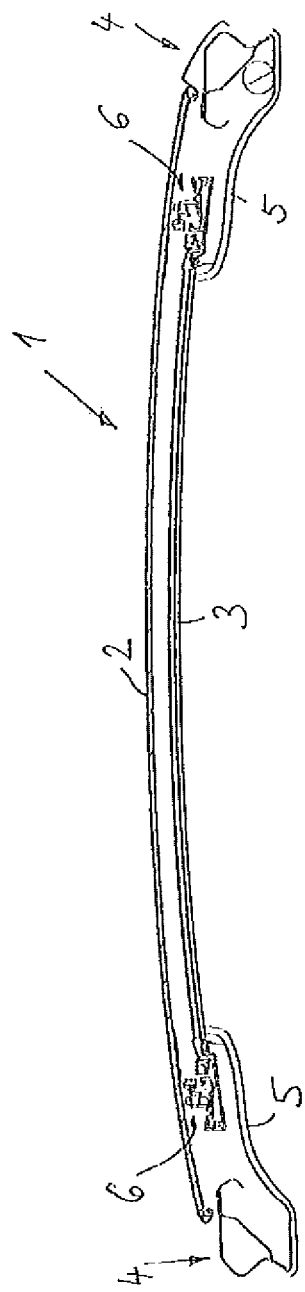
FIG. 1 shows a cross-sectional view of a roof module of a passenger motor vehicle comprising an embodiment of a drive system according to the invention on opposing longitudinal sides of a roof opening of the roof module.

A roof module 1 according to FIG. 1 is part of a vehicle roof of a passenger motor vehicle. The roof module 1 comprises a dimensionally stable, movable roof part 2 which is designed as a glass top. A shading device 3 is provided on a lower face of the movable roof part 2 facing a vehicle interior, said shading device having a flexible shading structure which is held on a front end region and is able to be wound on and off a winding shaft and on an opposing front end region has a dimensionally stable pull-out profile which is displaceably mounted on opposing sides along a roof cut-out of the roof module 1 in the longitudinal direction of the vehicle. The movable roof part 2—viewed in the longitudinal direction of the vehicle—is flanked in each case on its opposing longitudinal sides by a roof frame 4 of a vehicle body. An inner face of the vehicle roof in the region of the vehicle interior is formed by a roof lining 5.

Figure 2:
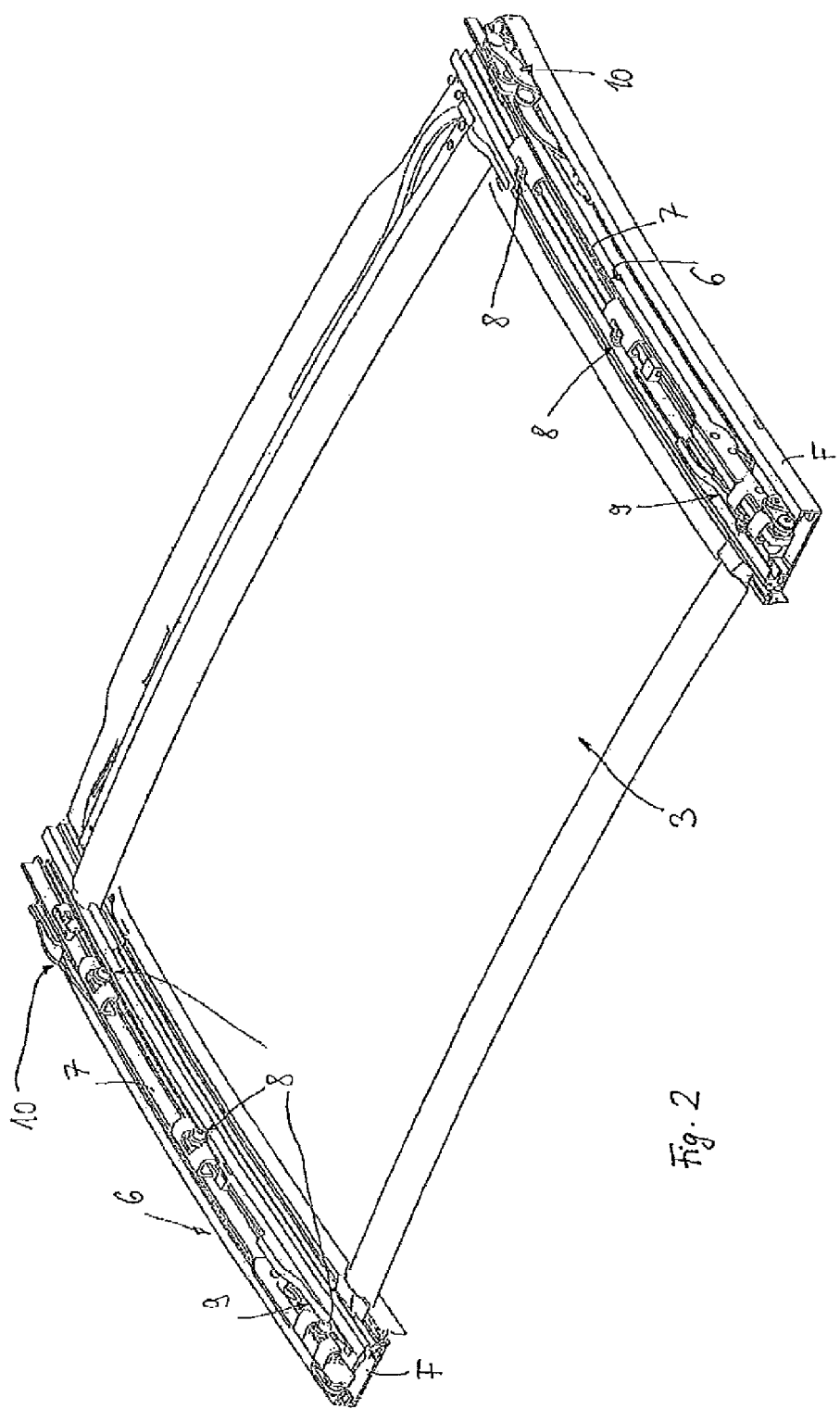
FIG. 2 shows in an isometric view of the roof module according to FIG. 1 with the omission of the movable roof part.
Figure 3:
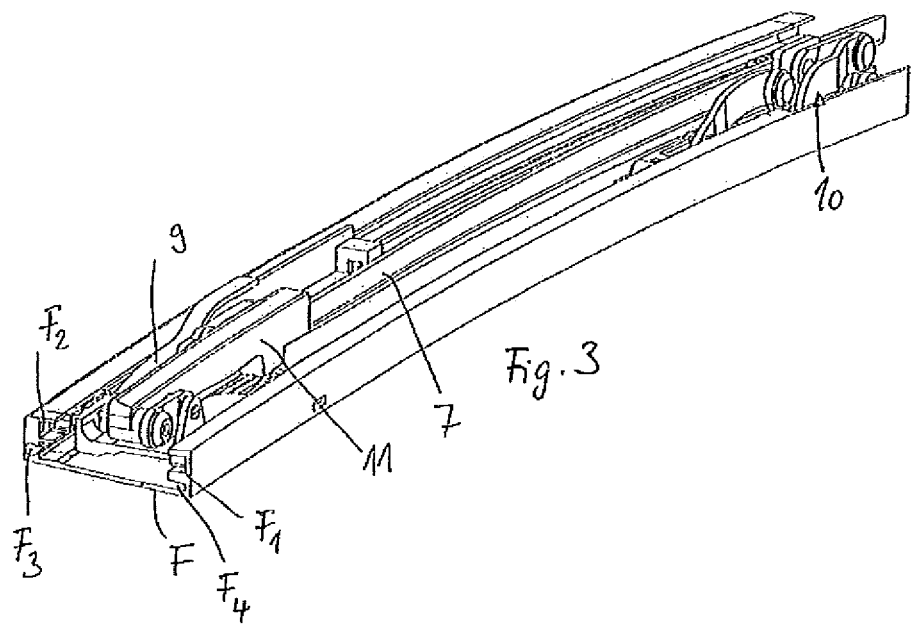
FIG. 3 shows in an isometric view of a left-hand drive system for the roof module according to FIGS. 1 and 2 viewed from the front in the longitudinal direction of the vehicle.
Figure 4:
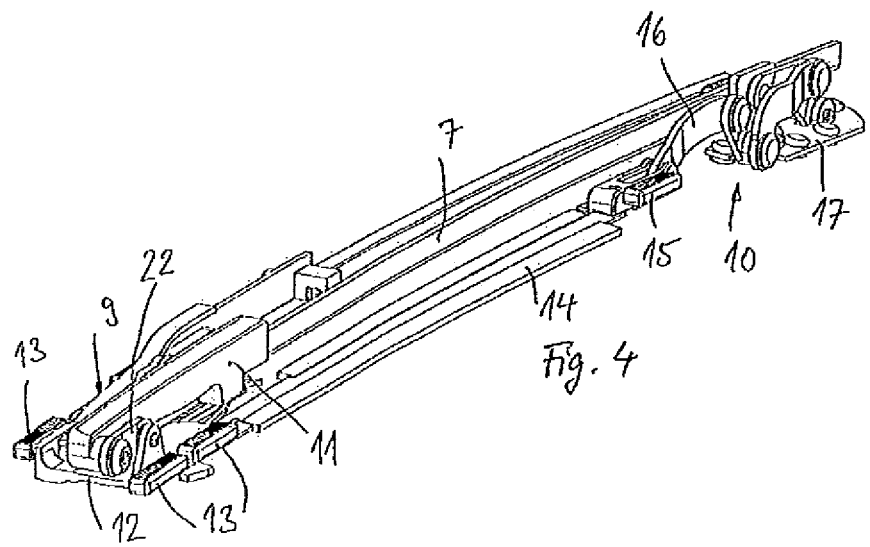
FIG. 4 shows the drive system according to FIG. 3 with the omission of a stationary guide rail of the roof module.

The movable roof part 2 is able to be displaced by means of two drive systems 6, designed to be functionally identical to one another, between a closed position shown in FIG. 1 and an open position lifted and displaced to the rear in the longitudinal direction of the vehicle. Each drive system 6 forms part of the roof module 1 and is driven synchronously via a common electrical drive unit. The design of the two drive systems 6 which is functionally identical but provided mirror-symmetrically relative to a vertical central longitudinal plane of the vehicle interior is shown with reference to FIG. 2. The left-hand drive system 6 viewed in the direction of travel of the passenger motor vehicle (i.e. the right-hand drive system 6 in the drawings according to FIG. 2) is described in more detail and shown with reference to FIGS. 3 to 28. The drawings and description apply equally to the opposing drive system 6. If the individual drawings have clear differences in individual components of the drive system 6, the drawings are nevertheless understood as forming part of a single preferred exemplary embodiment.

Each drive system 6 is driven by means of an elongated drive transmission means, in the present case in the form of a threaded shaft train also denoted as a flexible shaft, as is described hereinafter in more detail.

The drive system 6 has a dimensionally stable support bar 7 which in the mounted state of the roof module 1 extends in the longitudinal direction of the vehicle and is fastened via adjusting elements 8 to a lower face of the movable roof part 2. The adjusting elements 8, in addition to fastening the support bar 7 to the lower face of the roof part 2, also serve to adjust the movable roof part 2 in its position relative to the vehicle roof. To this end, the adjusting elements 8 on an inner face facing the vehicle center, i.e. the center of the roof module 1, have tool engagement surfaces which may be operated by means of a corresponding tool from the vehicle interior. The adjustment of the roof module 2 may take place in the closed position of the roof part 2 from the vehicle interior, by the adjusting means or adjusting elements 8 designed as screws initially being slightly tightened. Subsequently, the roof part 2 is adjusted relative to the adjacent contours of the vehicle roof and finally the fastening takes place by corresponding tightening of the adjusting elements 8.

The support bar 7 in the region of its front face—viewed in the direction of travel of the passenger motor vehicle—is retained on a guide carriage 9. To the rear, the support bar 7 is slidably movably mounted on a tilting mechanism 10. By a displacement of the support bar 7 (in an identically synchronous manner with the opposing support bar 7 of the opposing drive system 6) a corresponding displacement of the roof part 2 takes place automatically from the closed position into a ventilation position and subsequently into an open position displaced to the rear.

Figure 13:
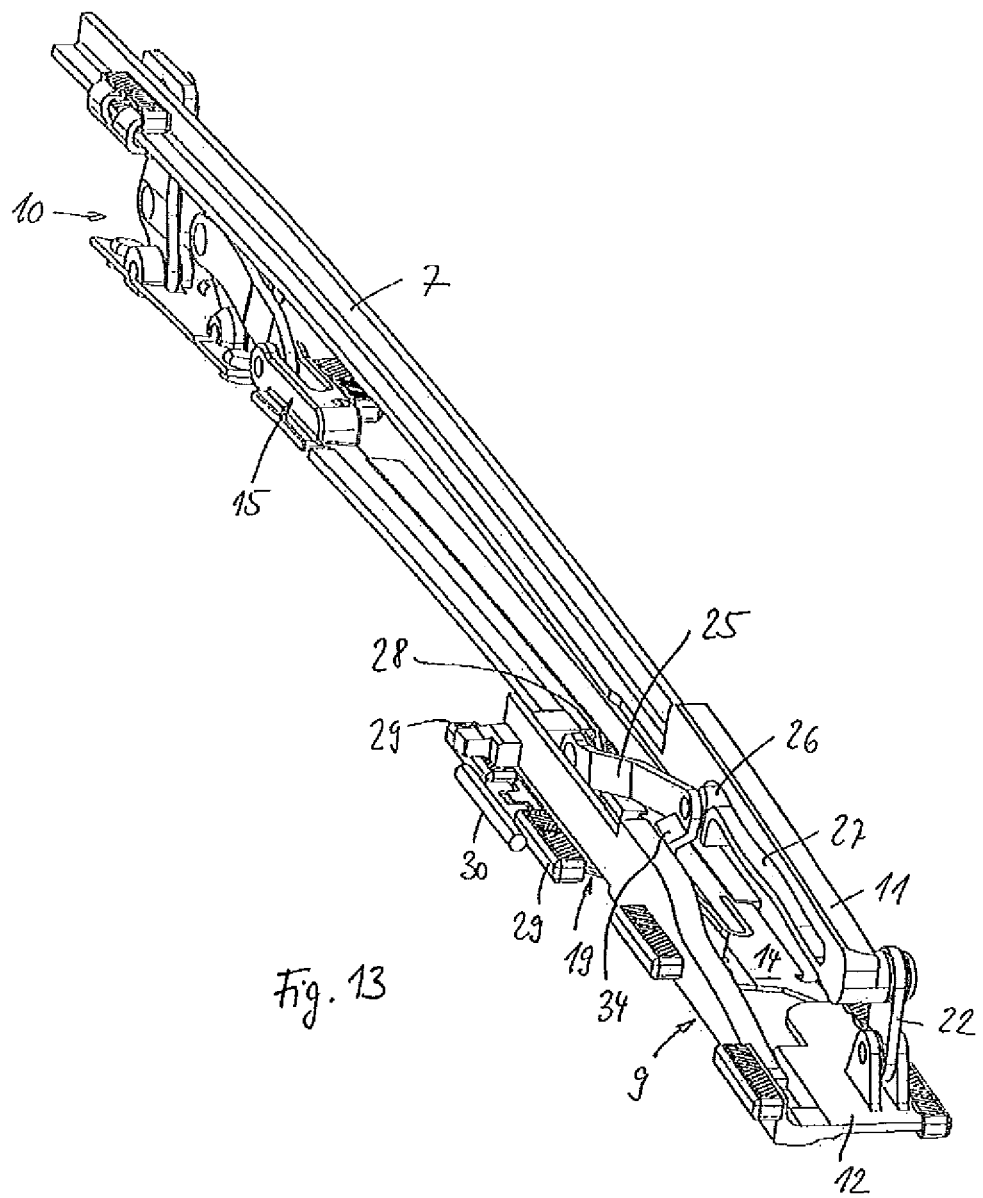
FIG. 13 shows in an enlarged isometric view of the drive system according to FIGS. 3 to 12.

A control carriage 19 is provided for actuating the guide carriage 9 and the tilting mechanism 10, said control carriage being directly connected to the drive transmission train actuated by the electrical drive unit via a driver 30 (FIG. 13). Both the guide carriage 9 and the control carriage 19 are longitudinally displaceably mounted in a guide rail F arranged fixedly to the roof. To this end, the guide carriage 9 comprises a plurality of sliding elements 13 which are slidably movably guided in opposing guide grooves F1, F2 serving as guide tracks, in the longitudinal direction of the guide rail F. The guide groove F2 is arranged offset upwardly relative to the guide groove F1 in relation to a base of the guide rail F. In the same manner, the sliding elements 13 on opposing sides of the guide carriage 9 are accordingly also arranged offset to one another vertically. The guide carriage 9 comprises a dimensionally stable base element 12 on which the sliding elements 13 are arranged and which defines the sliding mobility of the guide carriage 9. A bearing block for a tilting lever 22 is provided on the base element 12, said bearing block at its end remote from the base element 12 being pivotably movably connected to a slide part 11 of the support bar 7. Corresponding pivot axes for the articulation of the tilting lever 22 on the bearing block of the base element 12, on the one hand, and on the slide part 11, on the other hand, extend parallel to one another in the transverse direction of the vehicle.

Figure 16:
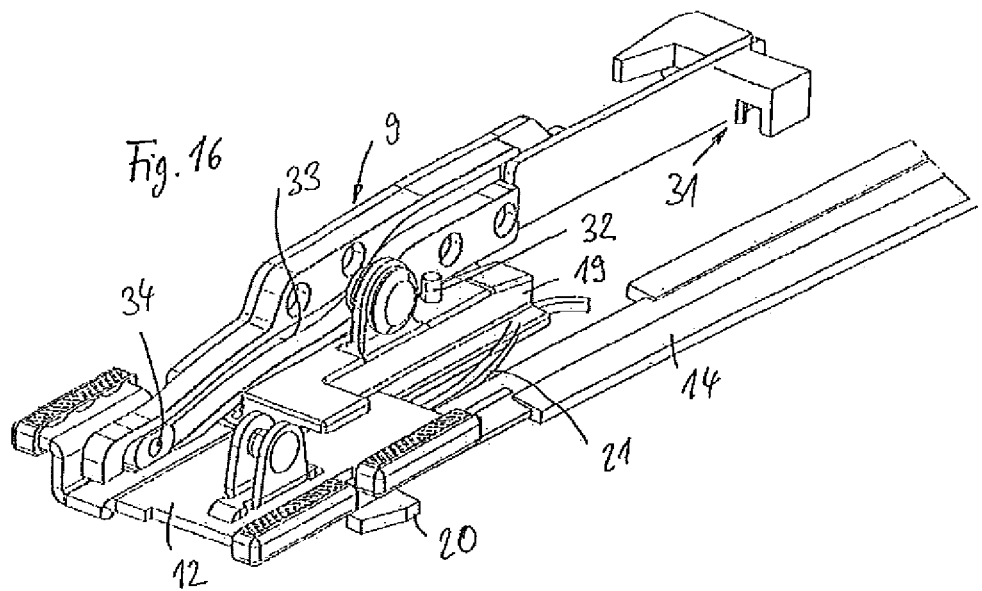
FIG. 16 shows in an enlarged isometric view a detail of a front region of the drive system according to FIG. 14.

In the transverse direction of the vehicle, spaced apart from the slide part 11, the guide carriage 9 comprises a slide carrier which is fastened to the base element 12 and extends to the rear in the longitudinal direction of the vehicle and which runs parallel to the slide part 11. A guiding slide 33 is provided in the slide carrier, said guiding slide being designed as a groove which is open toward the support bar 7 and the slide part 11 (FIG. 16). The slide part 11 has a control slide 27 (FIG. 13) adapted to the guiding slide 33. The control slide 27 is terminated in its rear region in a slide extension running vertically downwards.

Figure 17:
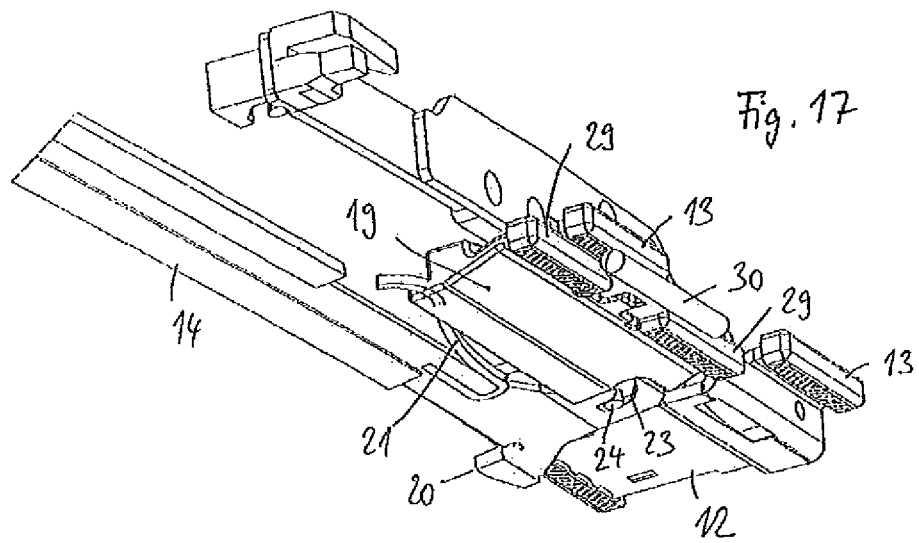
FIG. 17 shows the detail according to FIG. 16 in a different isometric view obliquely from below.
Figure 26:
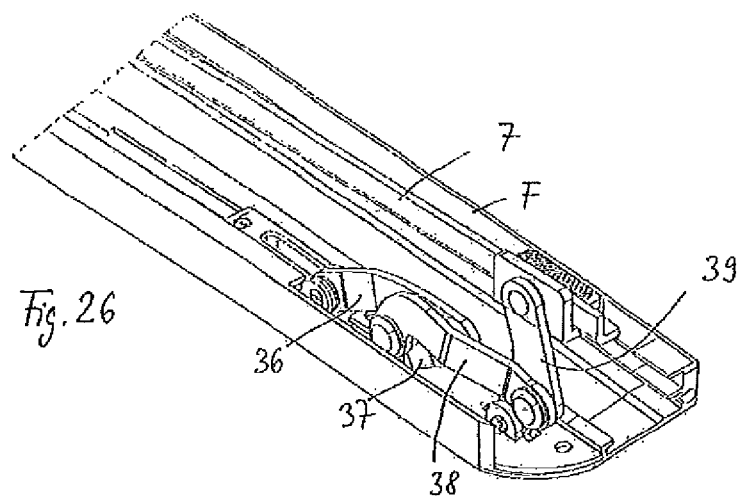
Figure 27:
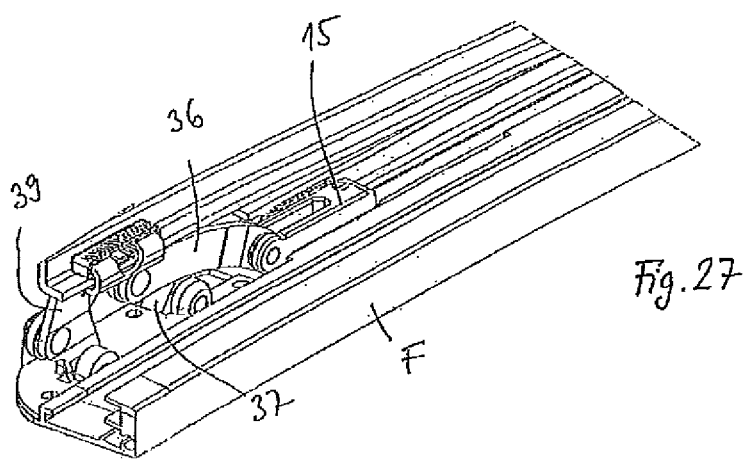
Figure 28:
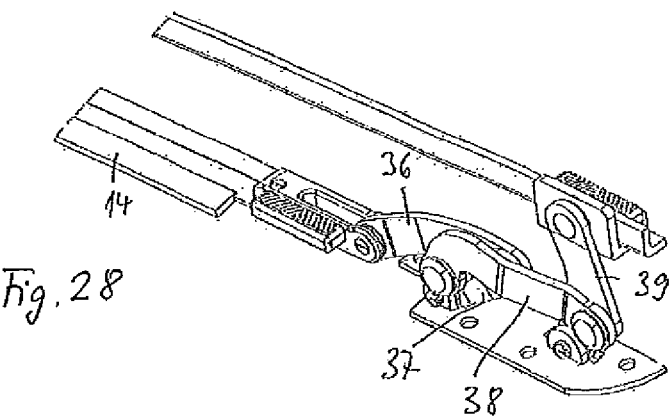

The slide carrier provided with the guiding slide 33 additionally has a rearwardly protruding guide projection which at the end is provided with an axial stop 31 which protrudes into a movement path of the control carriage 19. With reference to FIGS. 16 and 17 it may be seen that the control carriage 19 is displaceable along the slide carrier and the guide projection of the guide carriage 9. To this end, sliding elements 29 are assigned to the control carriage 19 on an outer face, said sliding elements being displaceably guided in a guide track below the guide groove F2. Directly adjacent to said guide track is a guide groove F3 provided for the displacement of the threaded shaft train and the driver 30 of the control carriage 19. The control carriage 19 has a smaller width than the base element 12 of the guide carriage 9. With reference to FIG. 16, it may be seen that the control carriage 19 is able to move into a corresponding recess of the base element 12 to such an extent that the control carriage 19 partially overlaps the base element 12. The base element 12 forms a front axial stop for the control carriage 19 in the forward direction of movement. Between this stop on the base element 12 and the axial stop 31 of the guide projection, which continues to the rear away from the slide carrier of the guide carriage 9, a defined axial displacement path is produced for the control carriage 19 relative to the guide carriage 9. The control carriage 19 has on its upper face an upwardly protruding stop pin 32 which positively penetrates the axial stop 31 at its end during a displacement movement of the control carriage 19 relative to the guide carriage 9 to the rear. As soon as the control carriage 19 strikes the region of the axial stop 31 at the rear, with a further drive movement via the driver 30 the control carriage automatically drives the guide carriage 9. Accordingly, in reverse, the control carriage 19 drives the guide carriage 9 with a forward movement as soon as the control carriage 19 strikes against the base element 12.

The control carriage 19 is provided with a pivot bearing 28 for a control lever 25 which at its end remote from the pivot bearing 28 is provided with two slide pins 26, 34 protruding on opposing sides. The one slide pin 26 protrudes into the control slide 27 of the slide part 11 of the support bar 7 (FIG. 13). The other slide pin 34 protrudes over a projection protruding downwardly into the guiding slide 33 of the slide carrier of the guide carriage 9 (FIG. 16). Both the guiding slide 33 and the control slide 27 extend in an undulating manner in the longitudinal direction of the guide rail and in detail have shapes which are different but adapted to one another and to the movement of the control lever 25, which may be derived from the drawings.

The control carriage 19 is provided on the lower face with a drive pin 24 serving as coupling means which is provided for driving a coupling profile 14, which extends in the manner of a planar strip on a base of the guide rail F. A lateral guide groove F4 on the base of the guide groove F (FIG. 3) serves for the slidably moveable guidance of the coupling profile 14. The coupling profile 14 is provided at its front end region— viewed in the normal direction of travel of the passenger motor vehicle—with a driver profile 23 corresponding to the driver pin 24, which driver profile 23 is open on one side in order to permit the receiving and release of the driver pin 24 relative to the coupling profile 14.

Figure 7:
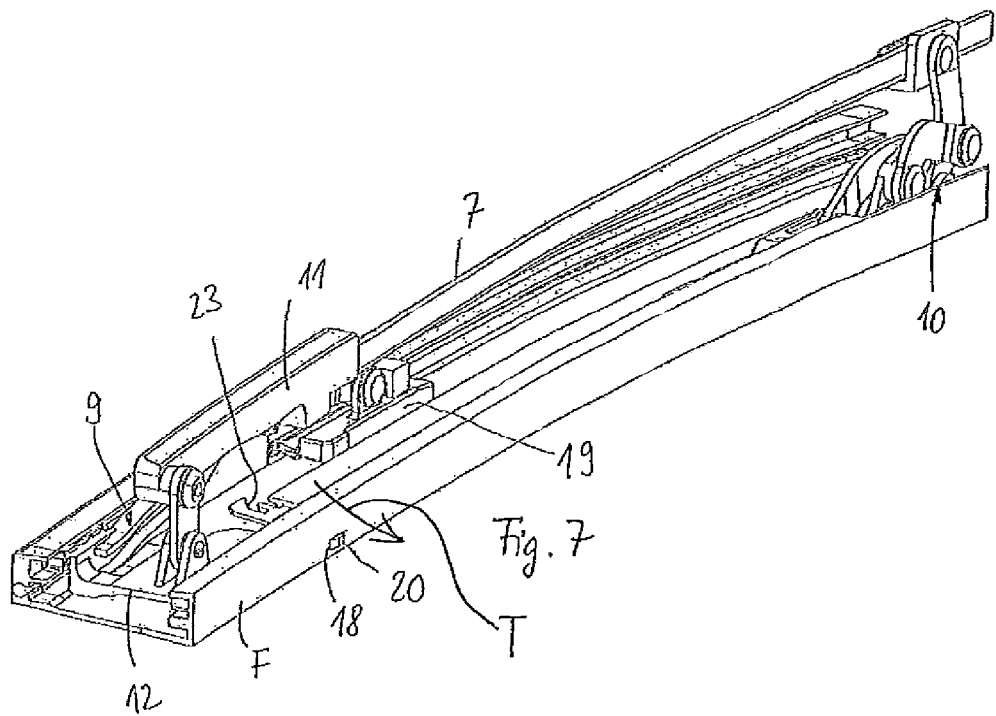
FIG. 7 shows the drive system according to FIGS. 3 to 6 in a partially open intermediate position.
Figure 8:
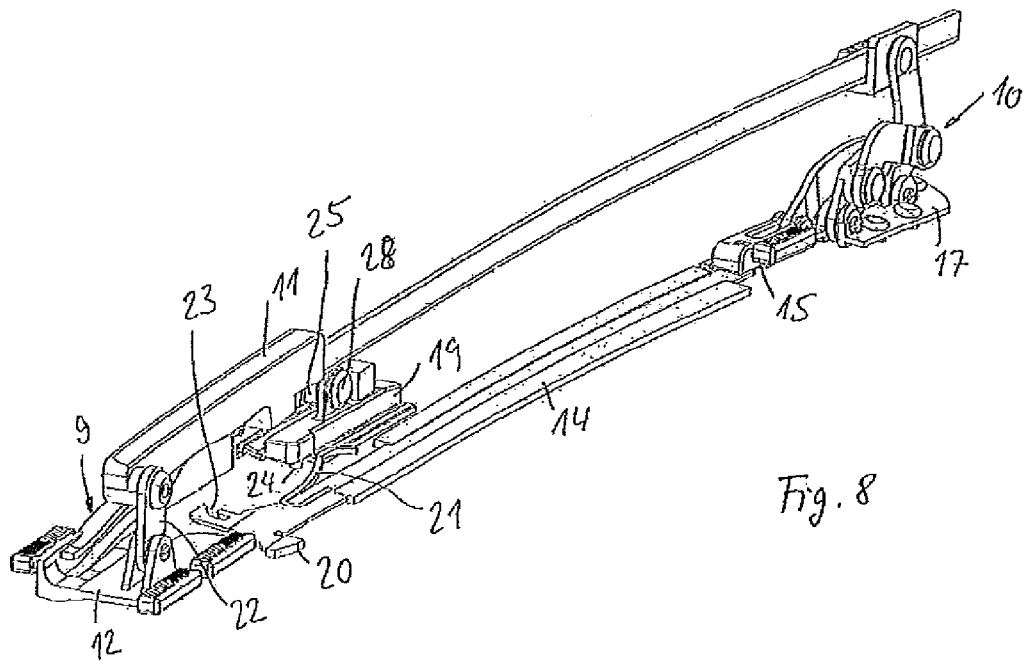
FIG. 8 shows the drive system according to FIG. 7 with the omission of the guide rail.
Figure 9:
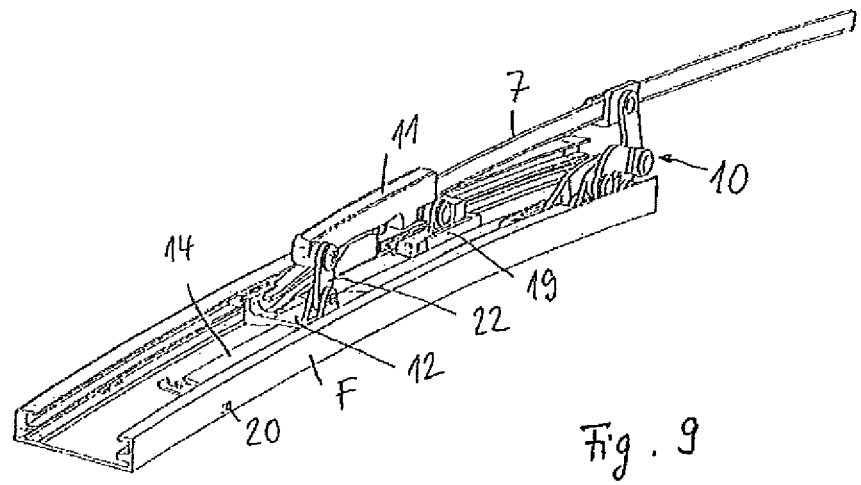
FIG. 9 shows the drive system according to FIGS. 3 to 8 in a further intermediate position.
Figure 10:
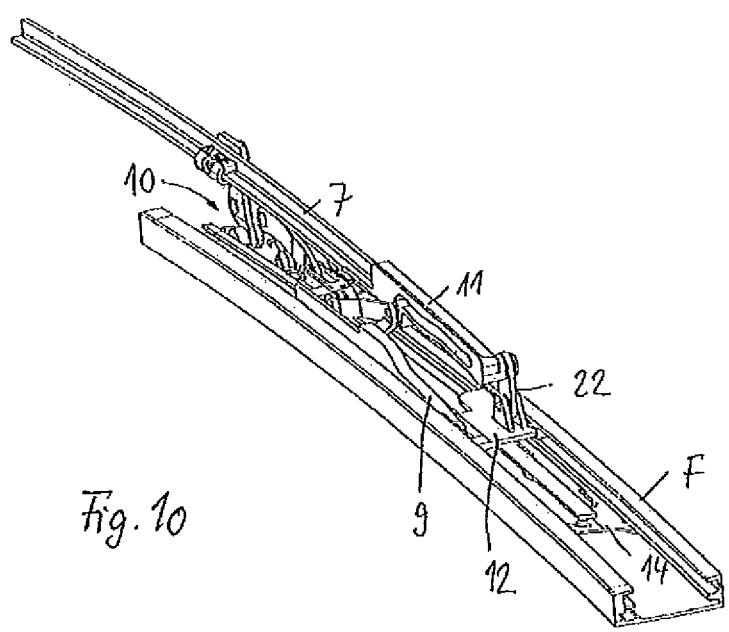
FIG. 10 shows the drive system according to FIG. 9 in a further isometric view obliquely from the front and from inside.
Figure 11:
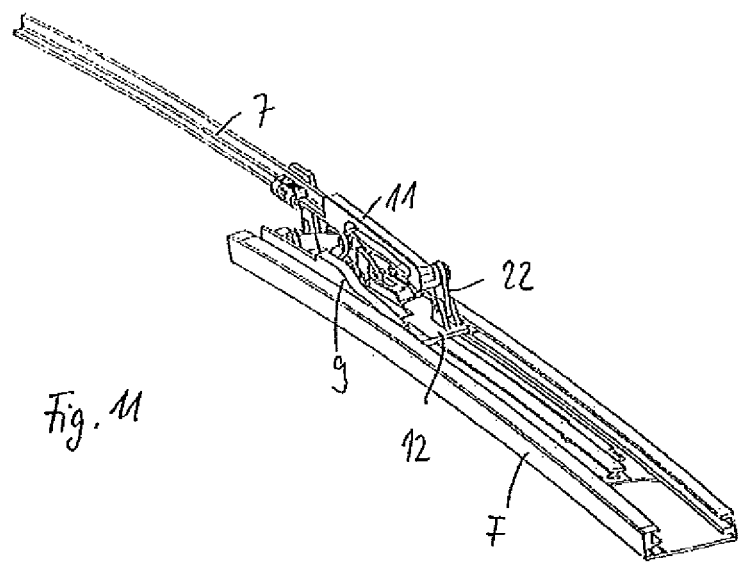
FIG. 11 shows the drive system according to FIGS. 3 to 10 in an open position.
Figure 12:
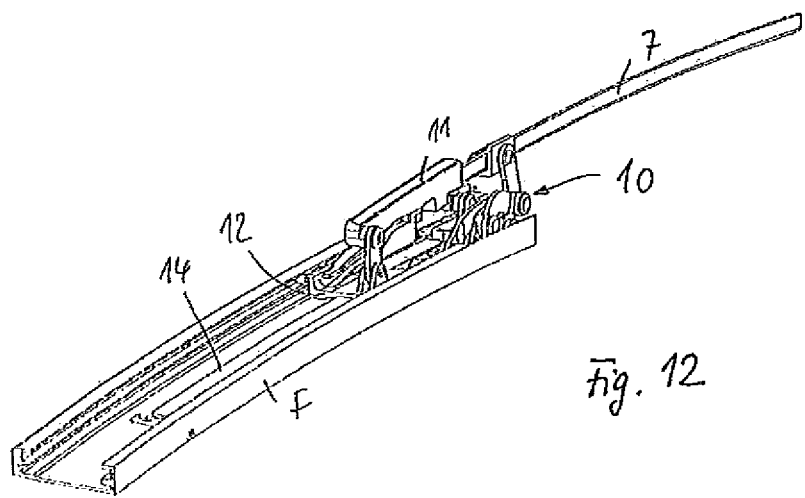
FIG. 12 shows the open position according to FIG. 11 in a different perspective.

The coupling profile 14 is pivotably mounted at a rear front end region about a pivot axis 14a (FIG. 15) extended in the vertical direction of the vehicle on the base of a guide element 15, in order to be able to pivot the coupling profile 14 along the base of the guide rail F in the transverse direction of the vehicle (see arrow T in FIG. 7). This pivotable mobility serves to engage the coupling profile 14 in a manner in which it is fixed to the rail. To this end, a latching lug 20 is provided as a latching profile on the coupling profile 14, said latching lug in the region of a side wall of the guide rail F being assigned a latching recess 18 immediately adjacent to the guide groove F4 as a complementary latching profile.

The coupling profile 14 also has a leg spring 21 (FIG. 17) on one longitudinal side opposing the latching lug 20, said leg spring outwardly spring-loading the coupling profile 14 in the transverse direction of the vehicle as soon as the leg spring 21 is pretensioned to the side on the control carriage 19, by the leg spring 21 coming to bear against a corresponding supporting surface 35 (FIG. 18) of the control carriage 19. The coupling profile 14 is positioned below the guide plane of the guide carriage 9 so that the guide carriage 9 is able to be moved beyond the coupling profile 14 in the longitudinal direction. The width of the coupling profile 14 is additionally dimensioned such that the control carriage 19 is able to be guided past the coupling profile 14 to the side in the longitudinal direction, without the coupling profile 14 hindering the longitudinal movement of the control carriage 19.

The guide element 15, on which the coupling element 14 is pivotably movably mounted in the transverse direction of the vehicle, transmits longitudinal movements of the coupling profile 14 to the tilting mechanism 10 which is constructed as a pivoting lever arrangement consisting of a plurality of pivoting lever portions cooperating with one another. The tilting mechanism 10 is fastened to a base of the guide rail F via a base carrier 17, and as a result is arranged in a stationary manner relative to the guide rail F. The pivoting lever arrangement according to FIGS. 21 to 28 comprises a transmission lever 36 articulated to the rear on the guide element 15. All lever portions of the pivoting lever arrangement are pivotably movably mounted about pivot axes extending in the transverse direction of the vehicle and parallel to one another. The transmission lever 36 acts on a double lever 37 which in turn is operatively connected to an angled adjusting lever 38. The adjusting lever 38 transmits corresponding pivoting forces to a tilting lever 39, at the upper end thereof a sliding guide being pivotably movably mounted about a pivot axis extending in the transverse direction of the vehicle, said sliding guide slidably movably receiving the support bar 7. The geometric shapes of the different lever portions of the tilting mechanism 10 designed as a pivoting lever arrangement may be clearly seen with reference to FIGS. 21 to 28, so that for a detailed description of the embodiments of the lever portions reference is additionally made to the disclosure in these drawings.

The function of the drive system 6 is described hereinafter.

Figure 5:
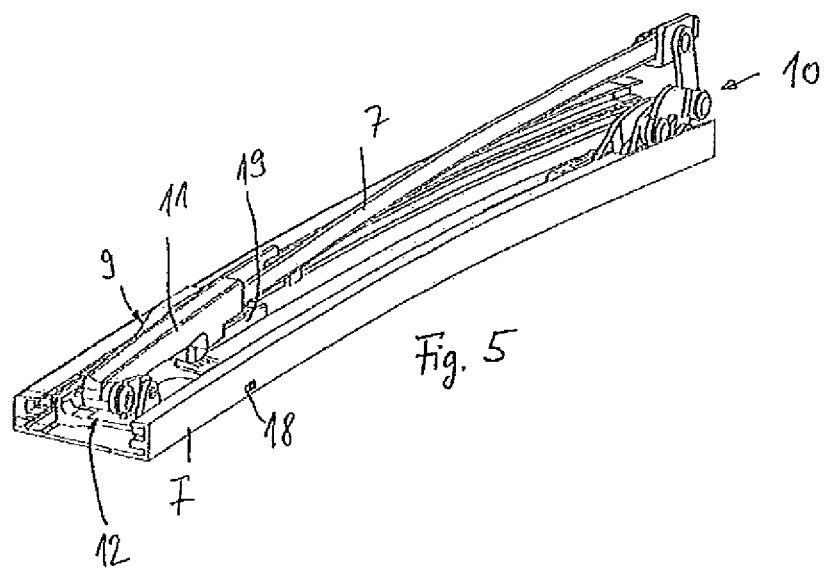
FIG. 5 shows the drive system according to FIGS. 3 and 4 in a ventilation position.
Figure 6:
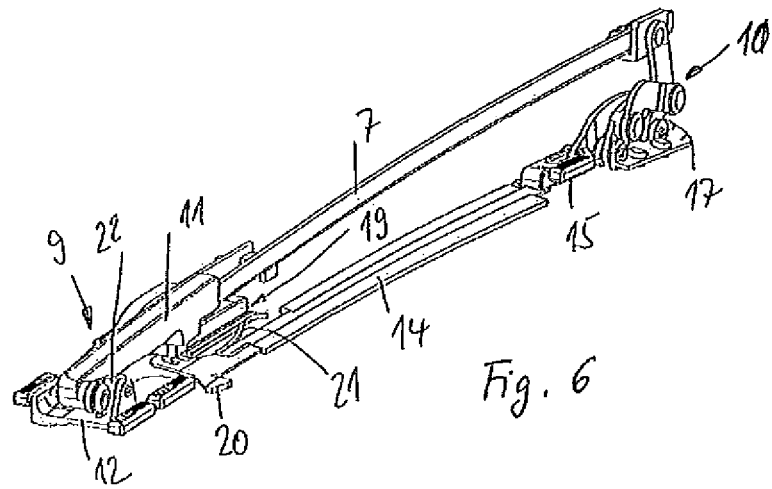
FIG. 6 shows the drive system according to FIG. 5 with the omission of the guide rail.

In a closed position of the roof part 2 and the drive system 6 according to FIGS. 3, 4 and 16, 17, the control carriage 19 is automatically moved to the rear in a longitudinal direction, by a rearward movement of the driver 30 in the longitudinal direction of the guide rail F. The control carriage 19 drives the coupling profile 14 via the driver pin 24 and the driver profile 23, whereby the guide element 15 is displaced to the rear and via the tilting mechanism 10 transfers the tilting lever 39 into an upwardly tilted end position (see FIGS. 5 and 6 and 28). In the upper end position of the tilting lever 39, the transmission lever 36 (FIG. 28) in combination with the other lever portions 37, 38 is automatically guided into a position above dead center, in which a further longitudinal movement of the guide element 15 and the coupling profile 14 is blocked. The control carriage 19 moving further to the rear is thus released with its driver pin 24 from the coupling profile 14. When the control carriage 19 slides past the leg spring 21, the coupling profile 14 is automatically pressed outwardly to the side. In this case, the coupling profile 14 is already in a position in which the latching lug 20 engages in the latching recess 18 of the guide rail F (FIG. 5). Thus the coupling profile 14 is positively secured in the longitudinal direction of the guide rail F. At the same time, a securing of the tilted end position of the tilting mechanism 10 is automatically achieved as a result.

During the movement of the control carriage 19 to the rear, the control lever 25 is also automatically driven by the control carriage 19, whereby the slide pins 26, 34 slide along the control slide 27 and the guiding slide 33. By a corresponding design of the control slide 27 and the guiding slide 33, the slide part 11 of the support bar 7 is lifted. At the same time, the adjusting lever 22 is pivoted out of the initial position upwardly and to the rear (FIG. 13).

As soon as the control carriage 19 strikes the axial stop 31, the control carriage 19 automatically drives the guide carriage 9 with a further longitudinal movement to the rear. In this intermediate position, the slide part 11 of the support bar 7 is already in its upwardly tilted position (see FIGS. 7 and 8). With a further longitudinal movement of the control carriage 19 to the rear, the guide carriage 9 is automatically driven, whereby the entire support bar 7 including the movable roof part 2 is displaced to the rear. The unit formed by the control carriage 19 and the guide carriage 9 is displaced to the rear as far as the rear end position of the unit in the guide rail F. Corresponding intermediate positions are able to be seen with reference to FIGS. 9 and 10. The end position of the guide carriage 9 and the control carriage 19 displaced to the rear is shown with reference to FIGS. 11 and 12. In this position, the movable roof part 2 is in its opened end position, i.e. in its open position.

A further closing of the roof part 2 takes place by corresponding reverse controlled movement of the control carriage 19 to the front in the drive direction.

The invention claimed is:

1. A drive system for a movable roof part of a roof module of a motor vehicle, comprising a support bar to which the roof part is fastened, wherein the support bar during operation of the drive system is displaced between a closed position of the roof part, a ventilation position and an open position of the roof part displaced to the rear over a stationary roof part of the roof module, wherein for the displacement of the support bar between the closed position and the open position of the roof part, viewed in a longitudinal direction of the vehicle, a front guide carriage, a rear tilting mechanism and a control carriage mechanically controlling the guide carriage and the rear tilting mechanism are provided, and wherein the guide carriage and the control carriage are longitudinally displaceable in a guide rail fixed to the roof module, the drive system further comprising a drive member movable along the guide rail for displacing the control carriage, wherein the guide carriage and the control carriage are geometrically designed for positioning and displacement inside the guide rail in overlapping relation with one another in parallel in a transverse direction of the vehicle, a control slide arranged on a front face of the support bar, said control slide being flanked in parallel by a complementary guiding slide arranged on the guide carriage, and the control carriage having a control lever arranged between the control slide and the guiding slide and on opposing sides in the transverse direction of the vehicle being operatively connected to the control slide of the support bar, on the one hand, and the guiding slide of the guide carriage, on the other hand.

2. A drive system for a movable roof part of a roof module of a motor vehicle, comprising a support bar to which the roof part is fastened, wherein the support bar during operation of the drive system is displaced between a closed position of the roof part, a ventilation position and an open position of the roof part displaced to the rear over a stationary roof part of the roof module, wherein for the displacement of the support bar between the closed position and the open position of the roof part, viewed in a longitudinal direction of the vehicle, a front guide carriage, a rear tilting mechanism and a control carriage mechanically controlling the guide carriage and the rear tilting mechanism are provided, and wherein the guide carriage and the control carriage are longitudinally displaceable in a guide rail fixed to the roof module, the drive system further comprising a drive member movable along the guide rail for displacing the control carriage, wherein the guide carriage and the control carriage are geometrically designed for positioning and displacement inside the guide rail in overlapping relation with one another in parallel in a transverse direction of the vehicle, wherein the guide carriage comprises a front axial stop and a rear axial stop for the control carriage, said axial stops being spaced apart from one another according to a first displacement path of the control carriage and limiting the displacement path of the control carriage relative to the guide carriage and effecting a driving of the guide carriage by the control carriage with a displacement movement along a further displacement path of the control carriage passing beyond the first displacement path.

3. A drive system for a movable roof part of a roof module of a motor vehicle, comprising a support bar to which the roof part is fastened, wherein the support bar during operation of the drive system is displaced between a closed position of the roof part, a ventilation position and an open position of the roof part displaced to the rear over a stationary roof part of the roof module, wherein for the displacement of the support bar between the closed position and the open position of the roof part, viewed in a longitudinal direction of the vehicle, a front guide carriage, a rear tilting mechanism and a control carriage mechanically controlling the guide carriage and the rear tilting mechanism are provided, and wherein the guide carriage and the control carriage are longitudinally displaceable in a guide rail fixed to the roof module, the drive system further comprising a drive member movable along the guide rail for displacing the control carriage, wherein the guide carriage and the control carriage are geometrically designed for positioning and displacement inside the guide rail in overlapping relation with one another in parallel in a transverse direction of the vehicle, wherein the rear tilting mechanism is operatively connected to a coupling profile protruding to the front in a longitudinal direction of the guide rail, said coupling profile being provided at a front end region thereof remote from the rear tilting mechanism with at least one coupling element which is provided for a connection with a limited path to a complementary coupling member of the control carriage.

4. The drive system as claimed in claim 1, wherein sliding elements are provided on each of to the guide carriage and the control carriage, said sliding elements being guided at least partially in guide tracks of the guide rail offset relative to one another in the vertical direction of the vehicle.

5. The drive system as claimed in claim 1, wherein the rear tilting mechanism has a pivoting lever mechanism which supports a tilted position of the support bar in a statically stable manner, and lever ratios and dimensioning thereof are designed such that, in the closed position of the roof part in the region of the rear tilting mechanism, an overall height of less than 42 mm, as measured from an upper edge of the roof part to a lower edge of the guide rail, is provided.

6. The drive system as claimed in claim 5, wherein over a total length of the guide rail, in the closed position of the roof part, the drive system has an overall height of at least 42 mm, as measured from an upper edge of the roof part to a lower edge of the guide rail.

7. The drive system as claimed in claim 1, wherein a manually actuatable fastening arrangement is provided for adjusting and securing the movable roof part to the support bar, said fastening arrangement having tool engagement surfaces oriented inwardly toward the roof center in the transverse direction of the vehicle, said tool engagement surfaces being accessible from the vehicle interior when the roof part is in the closed position.

8. The drive system as claimed in claim 2, wherein sliding elements are provided on each of the guide carriage and the control carriage, said sliding elements being guided at least partially in guide tracks of the guide rail offset relative to one another in the vertical direction of the vehicle.

9. The drive system as claimed in claim 2, wherein the rear tilting mechanism has a pivoting lever mechanism which supports a tilted position of the support bar in a statically stable manner, and lever ratios and dimensioning thereof are designed such that, in the closed position of the roof part in the region of the rear tilting mechanism, an overall height of less than 42 mm, as measured from an upper edge of the roof part to a lower edge of the guide rail, is provided.

10. The drive system as claimed in claim 9, wherein over a total length of the guide rail, in the closed position of the roof part, the drive system has an overall height of at least 42 mm, as measured from an upper edge of the roof part to a lower edge of the guide rail.

11. The drive system as claimed in claim 2, wherein a manually actuatable fastening arrangement is provided for adjusting and securing the movable roof part to the support bar, said fastening arrangement having tool engagement surfaces oriented inwardly toward the roof center in the transverse direction of the vehicle, said tool engagement surfaces being accessible from the vehicle interior when the roof part is in the closed position.

12. The drive system as claimed in claim 3, wherein the coupling profile is mounted with limited mobility transversely to the guide rail, and in that the guide rail and the coupling profile have latching and/or support profiles which are complementary to one another in order to secure the coupling profile positively in a latching position on the guide rail.

13. The drive system as claimed in claim 12, wherein at least one spring element which is effective between the control carriage and the coupling profile is provided, said spring element spring-loading the coupling profile in the direction of the latching and/or support profile of the guide rail.

14. The drive system as claimed in claim 3, wherein sliding elements are provided on each of the guide carriage and the control carriage, said sliding elements being guided at least partially in guide tracks of the guide rail offset relative to one another in the vertical direction of the vehicle.

15. The drive system as claimed in claim 3, wherein the rear tilting mechanism has a pivoting lever mechanism which supports a tilted position of the support bar in a statically stable manner, and lever ratios and dimensioning thereof are designed such that, in the closed position of the roof part in the region of the rear tilting mechanism, an overall height of less than 42 mm, as measured from an upper edge of the roof part to a lower edge of the guide rail, is provided.

16. The drive system as claimed in claim 15, wherein over a total length of the guide rail, in the closed position of the roof part, the drive system has an overall height of at least 42 mm, as measured from an upper edge of the roof part to a lower edge of the guide rail.

17. The drive system as claimed in claim 3, wherein a manually actuatable fastening arrangement is provided for adjusting and securing the movable roof part to the support bar, said fastening arrangement having tool engagement surfaces oriented inwardly toward the roof center in the transverse direction of the vehicle, said tool engagement surfaces being accessible from the vehicle interior when the roof part is in the closed position.

* * * * *